Sept. 28, 1954  F. B. PETTY  2,690,025
FISHING LURE
Filed Dec. 6, 1950
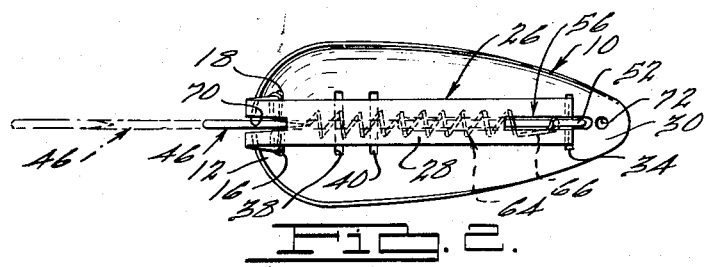
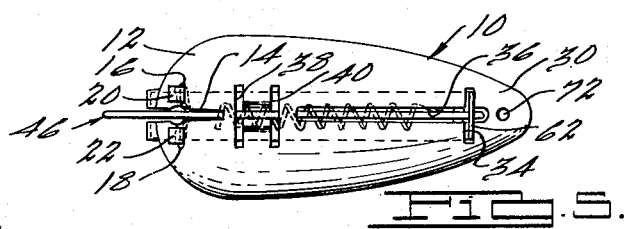

Patented Sept. 28, 1954

2,690,025

UNITED STATES PATENT OFFICE 2,690,025

FISHING LURE

Frank B. Petty, Highland Park, Mich.

Application December 6, 1950, Serial No. 199,453

11 Claims. (Cl. 43—35)

My invention relates generally to fishing equipment and has particular reference to a new improved type of fishing lure.

In the past, fishermen have been constantly troubled during casting and trolling operations by weeds, marsh grass and the like which becomes entangled with the hooks on the lures. As a result, the fishermen often times break their fishing lines and lose their lures. A great amount of time is lost when the fishermen are required to cease fishing in order to either attach new lures or remove the foreign matter which is entangled on the hooks of the old ones. A principal object of my invention is to provide a new and novel type of fishing lure which does not have an exposed hook to become entangled with foreign matter.

Another object of my invention is to provide a new and novel fishing lure which is simple in construction as well as economical to manufacture.

The invention deals generally with a fishing lure which is provided with a shiny spoon shaped body portion that attracts fish. This body portion has a hook and a hook guard or shield. The parts are arranged so that a spring expels or projects the hook outwardly a predetermined distance into a fish's mouth when the fish strikes at the lure. Before the fish strikes, the barbed end of the hook is completely shielded so that it may not become entangled with any foreign matter.

Other objects and advantages will become more apparent from the following description of one embodiment of my invention, reference being had to the accompanying drawings in which:

Fig. 1 is a side elevational view of my improved lure.

Fig. 2 is a plan view of the lure.

Fig. 3 is an elevational view of the trailing end of the lure.

Fig. 4 is an elevational view of the leading end of the lure.

Fig. 5 is a bottom view of the lure, and

Fig. 6 is a perspective view of the lure showing the hook in its extended position.

In the drawing I have shown the lure having a body portion 10 which is formed substantially in the shape of a spoon having convex and concave sides and has its convex side provided with a shiny finish to attract fish. Similar to most spoon shaped objects, the base member 10 has the side portions of its rearwardly extending or trailing end 12 curved upwardly more than the remaining side portions of the portion 10 and this end 12 is provided with a longitudinally extending slot 14. The slot 14 is approximately one fourth the length of the body portion 10. The end 12 of the body portion 10 is also provided with openings 16 and 18 which are equally spaced on opposite sides of the slot 14. The openings 16 and 18 receive legs 20 and 22 of the bifurcated rounded end 24 of a guard or shield generally designated by the numeral 26, respectively. The portions of the legs 20 and 22 which extend through the openings 16 and 18, respectively, are bent down against the convex side of the end 12 of the body portion 10 so that one end of the shield 26 clampingly engages the body portion 10 and is secured to it. The shield 26 is provided with a center section 28 which extends longitudinally of the lure to a location adjacent the forward or leading end 30 of the base member 10. The center section 28 is integrally connected to a depending abutment 32 which extends through a slot 34 deposed in the end 30 of the body portion 10. A longitudinally extending slot 36, in line with slot 14, extends from a point between the slot 34 and the forward tip of the body portion 10 to a point substantially in the center of the body portion. The utility of the slot 36 will be hereinafter set forth.

Two spaced slots 38 and 40 are disposed between the adjacent ends of the slots 14 and 36 and extend in a direction perpendicular to slots 14 and 36. A strap 42 formed in the body portion 10 by the slots 38 is pressed upwardly from the concave side of the body portion 10 as seen in the drawing and forms a channel through which the shank 44 of a hook, generally designated by the numeral 46, extends. The rearwardly extending or trailing end of the hook 46 is provided with a rounded portion 48 which has a fish impaling barb 50 extending substantially in the direction of the shank 44 toward the leading end of the line. The opposite end of the hook 46 is reverse bent or looped to form an upwardly extending eyelet 52 and then reverse bent in the opposite direction to form a depending abutment 54.

The shank 44 of the hook 46 extends through the slot 14 formed in the trailing end 12 of the body portion 10 and also through the channel formed by the slots 38 and 40 and the strap 42. The depending abutment 54 on the hook rides in the slot 36.

The depending abutment 32 of the shield 26 is provided with a slot generally designated by the numeral 56 having an upper narrow relatively long portion 58 and a lower wider relatively smaller portion 60. The lower tip of the depending abutment 32 adjacent the lower edge of the portion 60 of the slot 56 forms a shoulder 62.

A spring 64 is disposed above the shank 44 of the hook 46 and has one end 66 extending through and secured to the eyelet 52 and its other end 68 secured to the legs 20 and 22 adjacent their juncture with the body portion 10.

My improved lure is adapted to be set and thereafter sprung by a fish when it strikes the lure. The lure is ready for casting or trolling in the position shown in Figs. 1 to 5. In this position the abutment 32 is positioned relative to the body portion 10 so that the shoulder 62 extends only a short distance through the slot 34. At this location, the abutment 54 and most of the eyelet 52 extend through the slot 56 in the abutment 32 of the shield 26 and the tip of the abutment 32 engages the shoulder 62. As clearly shown in the drawings the abutment 32 frictionally engages the body within the slot 34 and is further retained in position by the pressure of the spring tensioned abutment 54 engaging the shoulder 62. The spring 64 is expanded and the barb 50 of the hook is disposed in contiguous relationship with the trailing end of the shield 26 wherein the barb 50 extends through a slot 70 (see Figs. 3 and 6) formed by the legs 20 and 22. In this position, the barb 50 is completely shielded and the lure may be pulled through the water without any fear of having the hook entangled with any foreign matter.

When a fish strikes at the lure, its mouth will close on it exerting pressure on the upper surface of the shield 26 and the convex side of the body portion 10. When this happens, the shield 26 will be moved to the position shown by the dotted and dashed lines in Fig. 1 and the solid lines in Fig. 6. In this position, the abutment 54 becomes disengaged from the shoulder 62 and is lined up with the wide portion 60 of the slot 56 while the eyelet 52 is lined up with the narrow portion 58 of the slot 56. Since these portions of the hook 46 are lined up with the slot 56, the hook will be released and the spring 64 will project the hook into the fish's mouth. When the hook is projected, the abutment 54 rides in the slot 36 until it reaches the end of this slot at which time it engages the body portion 10 to form a positive lock therebetween.

It will be seen that the shield 26 serves a dual function in that one end shields the barb 50 of the hook while the other end holds the hook in its shielded position. Similarly, the abutment 54 not only engages the shoulder 62 of the shield to hold the hook in its shielded position but also engages the body portion 10 and the end of the slot 36 to form a positive lock with the body portion. Due to the width of the slot 36, the abutment 54 also serves to prevent rotation of the hook about its longitudinal axis.

The body portion 10 is provided at its leading tip with an aperture 72 for receiving a fishing line.

It will be noted that my improved lure is constructed of only four parts made preferably of metal.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. A fishing lure comprising a spoon-shaped body portion, a hook carried by said body portion and having an abutment, a curved shield bowing outwardly from the concave side of said body portion carried by said body portion and having a first portion disposed in a contiguous relationship with the barbed end of said hook for guarding it against entanglement with foreign matter, said shield having a second portion engaging said abutment, and spring means coacting between said hook and said body portion for projecting said hook outwardly of said body portion when said abutment and said second portion of said shield become disengaged.

2. A weedless fishing lure comprising a generally spoon shaped body portion having concaved and convexed sides and having a longitudinally extending slot extending rearwardly from its leading extremity, a fishhook longitudinally slidably mounted on said body portion having its hooked end adjacent the concave side of said body portion, said hook having an abutment projecting from its leading end portion into said slot, a shield having one end attached to the trailing extremity of said body portion, said shield having a portion juxtaposed to the hooked end portion of said fishhook for guarding it against entanglement and having a slotted abutment on its leading end portion extending through said body portion, said abutment on said hook extending through the slot in said shield abutment and engaging a portion of said shield abutment for releasably holding said hook against rearward shifting movement relative to said body portion, the engaging portions of said abutments being adjacent said convex side of said body portion and being disengageable for accommodating rearward shifting of the hooked end portion of said hook into spaced relationship with respect to said shield by relative approaching movement of said shield and body portion, and a spring coacting between said body portion and said hook for projecting it rearwardly when said abutments are disengaged.

3. A weedless fishing lure comprising a generally spoon shaped body portion having a longitudinally extending slot extending rearwardly from its leading extremity, a fishhook longitudinally slidably mounted on said body portion, said hook having an abutment projecting from its leading end portion and extending through said slot, a shield having one end attached to said body portion, said shield having a trailing extremity juxtaposed to the hooked end portion of said fishhook for guarding it against entanglement and having an abutment on its leading end portion extending through said body portion and engageable with said abutment of said hook for releasably holding said hook against rearward shifting movement relative to said body portion, said abutments being disengageable for accommodating rearward shifting of the hooked end portion of said hook into spaced relationship with respect to said shield by relative approaching movement of said shield and body portion, and a spring coacting between said body portion and said hook for projecting it rearwardly when said abutments are disengaged.

4. A weedless fishing lure comprising a generally spoon-shaped body portion having a longitudinally extending slot extending rearwardly from its leading extremity, a fishhook longitudinally slidably mounted on said body portion, said hook at its leading end portion being reverse bent forming an eyelet extending in one direction and an abutment extending through said slot, a shield secured to said body portion, said shield having a trailing extremity juxtaposed to the hooked end portion of said fishhook for guarding it against entanglement and having an abutment on its leading end portion engageable with said abutment of said hook for releasably holding said hook against rearward shifting movement relative to said body portion, said abutments being disengageable for accommodating rearward shifting of the hooked end portion of said hook a predetermined distance into spaced relationship with respect to said shield by relative approaching movement of said shield and body portion, and a spring having one end secured to said eyelet and coacting between said body portion and said hook for projecting it rearwardly when said abutments are disengaged, said abutment on said fishhook riding in said slot during said projected movement and engaging an edge portion of said slot when said hook has moved said predetermined distance.

5. A fishing lure comprising a generally spoon shaped body portion, a fishhook longitudinally slidably mounted on said body portion, said hook at its leading end portion being reverse bent forming an eyelet extending in one direction and an abutment extending in another direction, a shield secured to said body portion, said shield having a portion juxtaposed to the hooked end portion of said fishhook for guarding it against entanglement and having an abutment on its leading end portion engageable with said abutment of said hook for releasably holding said hook against rearward shifting movement relative to said body portion, said abutments being disengageable for accommodating rearward shifting of the hooked end portion of said hook into spaced relationship with respect to said shield by relative approaching movement of said shield and body portion, and a spring having one end secured to said eyelet and coacting between said body portion and said hook for projecting it rearwardly when said abutments are disengaged.

6. A weedless fishing lure comprising a generally spoon shaped body portion having a longitudinally extending slot extending rearwardly from its leading extremity, a fishhook longitudinally slidably mounted on said body portion, said hook having an abutment projecting from its leading end portion into said slot, a shield secured to said body portion, said shield having an extremity juxtaposed to the hooked end portion of said fishhook for guarding it against entanglement and having an abutment on its leading end portion engageable with said abutment of said hook for releasably holding said hook against rearward shifting movement relative to said body portion, said abutments being disengageable for accommodating rearward shifting of the hooked end portion of said hook a predetermined distance into spaced relationship with respect to said shield by relative approaching movement of said shield and body portion, and a spring coacting between said body portion and said hook for projecting it rearwardly when said abutments are disengaged, said abutment on said fishhook riding in said slot during said projected movement and engaging an edge portion of said slot when said hook has moved said predetermined distance.

7. A weedless fishing lure comprising a generally spoon shaped body portion having a longitudinally extending slot extending rearwardly from its leading extremity, a fishhook longitudinally slidably mounted on said body portion, said hook having an abutment projecting from its leading end portion into said slot, a shield having one end attached to the trailing extremity of said body portion, said shield having a portion juxtaposed to the hooked end portion of said fishhook for guarding it against entanglement and having a slotted abutment on its leading end portion, said abutment on said hook extending through the slot in said shield abutment and engaging a portion of said shield abutment for releasably holding said hook against rearward shifting movement relative to said body portion, said abutments being disengageable for accommodating rearward shifting of the hooked end portion of said hook into spaced relationship with respect to said shield by relative approaching movement of said shield and body portion, and a spring coacting between said body portion and said hook for projecting it rearwardly when said abutments are disengaged.

8. A weedless fishing lure comprising a generally spoon shaped body portion having concaved and convexed sides and provided at its leading extremity with a line attaching aperture, a fishhook longitudinally slidably mounted on said body portion having its hooked end adjacent the concave side of said body portion, said hook having an abutment projecting from its leading end portion, a shield having one end attached to the trailing extremity of said body portion, said shield having a portion juxtaposed to the hooked end portion of said fishhook for guarding it against entanglement and having an abutment on its leading end portion extending entirely through said body portion and engageable with said abutment of said hook for releasably holding said hook against rearward shifting movement relative to said body portion, the engaging portions of said abutments being adjacent said convex side of said body portion and being disengageable for accommodating rearward shifting of the hooked end portion of said hook into spaced relationship with respect to said shield by relative approaching movement of said shield and body portion, and a spring coacting between said body portion and said hook for projecting it rearwardly when said abutments are disengaged.

9. A weedless fishing lure comprising a generally spoon shaped body portion having a longitudinally extending slot extending rearwardly from its leading extremity, a fishhook longitudinally slidably mounted on said body portion, said hook at its leading end portion being reverse bent forming an eyelet extending in one direction and an abutment extending through said slot, a shield secured to said body portion, said shield having a trailing slotted extremity receiving the pointed end of said fishhook for guarding it against entanglement and having an abutment on its leading end portion engageable with said abutment of said hook for releasably holding said hook against rearward shifting movement relative to said body portion, said abutments being disengageable for accommodating rearward shifting of said hook a predetermined distance into spaced and unshielded relationship with respect to said shield by relative approaching movement of said shield and body portion, and a spring having one end secured to said eyelet and coacting between said body portion and said hook for projecting said hook rearwardly when said abutments are disengaged, said abutment on said fishhook riding in said slot during said projected movement and engaging an edge portion of said slot when said hook has moved said predetermined distance.

10. A weedless fishing lure comprising a generally spoon shaped body portion having concaved and convexed sides and having a longitudinally extending slot extending rearwardly from its leading extremity, a fishhook longitudinally slidably mounted on said body portion having its hooked end adjacent the concave side of said body portion, said hook having an abutment projecting from its leading end portion into said slot, a shield having one end attached to the trailing extremity of said body portion, said shield having a trailing slotted extremity receiving the pointed end of said fishhook for guarding said fishhook against entanglement and having a slotted abutment on its leading end portion extending through said body portion, said abutment on said hook extending through the slot in said shield abutment and engaging a portion of said shield abutment for releasably holding said hook against rearward shifting movement relative to said body portion, the engaging portions of said abutments being adjacent said convex side of said body portion and being disengageable for accommodating rearward shifting of said hook into spaced and unshielded relationship with respect to said shield by relative approaching movement of said shield and body portion, and a spring coacting between said body portion and said hook for projecting it rearwardly when said abutments are disengaged.

11. A fishing lure comprising a body portion having means forming a channel and a longitudinally extending slot, a hook having a barb at one end and an abutment at the other end, said hook having a portion extending through said channel and said abutment extending into said slot, a hook shield having one end fixed to one end of said body portion and the other end of said shield slidably disposed in the other end of said body portion, said last mentioned end of said shield having an opening receiving said hook and a shoulder engaging said abutment on said hook, and a spring connecting said hook and said shield, said shield having a slot receiving said barb for protecting said hook from entanglement.

References Cited in the file of this patent

UNITED STATES PATENTS

| Number | Name | Date |
|---|---|---|
| 379,080 | Rice | Mar. 6, 1888 |
| 1,758,817 | Babbitt | May 13, 1930 |
| 2,010,641 | Nyvall | Aug. 6, 1935 |